(12) United States Patent
Maeda

(10) Patent No.: US 9,924,086 B2
(45) Date of Patent: Mar. 20, 2018

(54) DISPLAY APPARATUS, IMAGE CAPTURING SYSTEM, CONTROL METHOD FOR DISPLAY APPARATUS, AND STORAGE MEDIUM FOR DISPLAYING INFORMATION BASED ON ATTITUDE

(71) Applicant: CANON KABUSHIKI KAISHA, Tokyo (JP)

(72) Inventor: Muneyoshi Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 14/990,176

(22) Filed: Jan. 7, 2016

(65) Prior Publication Data

US 2016/0205308 A1 Jul. 14, 2016

(30) Foreign Application Priority Data

Jan. 9, 2015 (JP) .................................. 2015-003604

(51) Int. Cl.
*H04N 5/232* (2006.01)
*H04N 1/00* (2006.01)
*H04N 5/262* (2006.01)

(52) U.S. Cl.
CPC ..... *H04N 5/23203* (2013.01); *H04N 1/00129* (2013.01); *H04N 5/23222* (2013.01); *H04N 5/23229* (2013.01); *H04N 5/23258* (2013.01); *H04N 5/23274* (2013.01); *H04N 5/23293* (2013.01); *H04N 5/2628* (2013.01); *H04N 5/23245* (2013.01)

(58) Field of Classification Search
CPC ........... H04N 5/23203; H04N 1/00129; H04N 5/23222; H04N 5/23229; H04N 5/23258; H04N 5/23274; H04N 5/23293; H04N 5/2628
See application file for complete search history.

(56) References Cited

U.S. PATENT DOCUMENTS

| | | | | |
|---|---|---|---|---|
| 4,967,278 A | * | 10/1990 | Greenbaum | H04N 5/23293 348/231.4 |
| 5,790,085 A | * | 8/1998 | Hergesheimer | F41G 3/225 340/980 |
| 6,917,370 B2 | * | 7/2005 | Benton | G06T 19/006 345/204 |
| 6,963,365 B2 | * | 11/2005 | Baron | H04N 5/2259 345/647 |
| 6,968,094 B1 | * | 11/2005 | Gallagher | G06K 9/209 348/E5.046 |

(Continued)

FOREIGN PATENT DOCUMENTS

JP 2007-228097 A 9/2007
JP 2012-147071 A 8/2012

*Primary Examiner* — Nicholas Giles
(74) *Attorney, Agent, or Firm* — Cowan, Liebowitz & Latman, P.C.

(57) ABSTRACT

There is provided a display apparatus. A reception unit receives a captured image from an image capturing apparatus. A display unit displays the captured image. A detection unit detects an attitude of the display apparatus. A transmission unit, while the display unit is displaying the captured image, transmits attitude information to the image capturing apparatus in response to an instruction from a user. The attitude information indicates the attitude detected by the detection unit.

11 Claims, 12 Drawing Sheets

(56) References Cited

U.S. PATENT DOCUMENTS

| | | | | |
|---|---|---|---|---|
| 7,495,198 B2* | 2/2009 | Ari | ............ | F41G 3/225 244/3.1 |
| 7,735,230 B2* | 6/2010 | Barany | ............ | A42B 3/0433 33/1 CC |
| 8,854,482 B2* | 10/2014 | Molgaard | ............ | G03B 17/00 348/208.3 |
| 9,094,655 B2* | 7/2015 | Suzuki | ............ | H04N 9/87 |
| 9,270,966 B2* | 2/2016 | Suzuki | ............ | H04N 9/87 |
| 9,294,673 B2* | 3/2016 | Kira | ............ | H04N 13/0011 |
| 9,473,699 B2* | 10/2016 | Suzuki | ............ | H04N 5/23238 |
| 9,485,484 B2* | 11/2016 | Suzuki | ............ | G11B 27/322 |
| 2002/0118292 A1* | 8/2002 | Baron | ............ | H04N 5/2259 348/335 |
| 2005/0117024 A1* | 6/2005 | Lee | ............ | H04N 5/2628 348/208.15 |
| 2008/0204566 A1* | 8/2008 | Yamazaki | ............ | G03B 5/00 348/208.99 |
| 2009/0278975 A1* | 11/2009 | Grosspietsch | ............ | G01C 9/00 348/335 |
| 2011/0205377 A1* | 8/2011 | Molgaard | ............ | G03B 17/00 348/208.4 |
| 2013/0321568 A1* | 12/2013 | Suzuki | ............ | H04N 5/23238 348/36 |
| 2013/0322843 A1* | 12/2013 | Suzuki | ............ | G11B 27/322 386/230 |
| 2013/0322845 A1* | 12/2013 | Suzuki | ............ | H04N 9/87 386/230 |
| 2014/0072274 A1* | 3/2014 | Nitta | ............ | H04N 9/87 386/230 |
| 2014/0132705 A1* | 5/2014 | Kira | ............ | H04N 13/0011 348/36 |
| 2014/0140677 A1* | 5/2014 | Cho | ............ | H04N 5/772 386/230 |
| 2014/0270692 A1* | 9/2014 | Suzuki | ............ | H04N 9/87 386/230 |
| 2016/0048942 A1* | 2/2016 | Irie | ............ | G06F 3/0488 345/619 |
| 2016/0366460 A1* | 12/2016 | Suzuki | ............ | G11B 27/322 |

* cited by examiner

FIG. 1
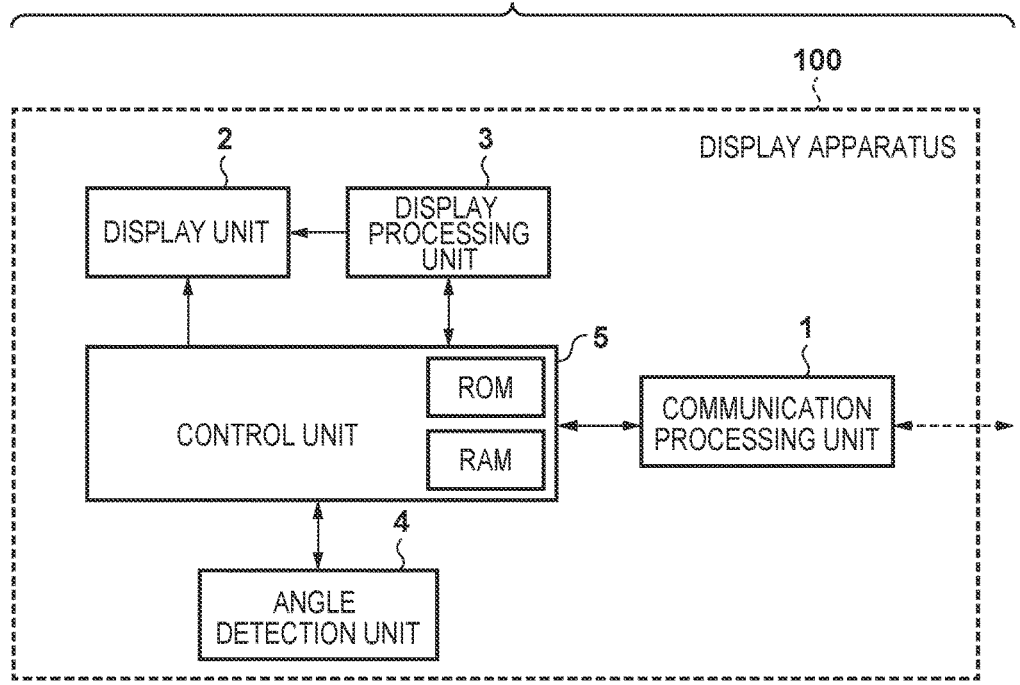
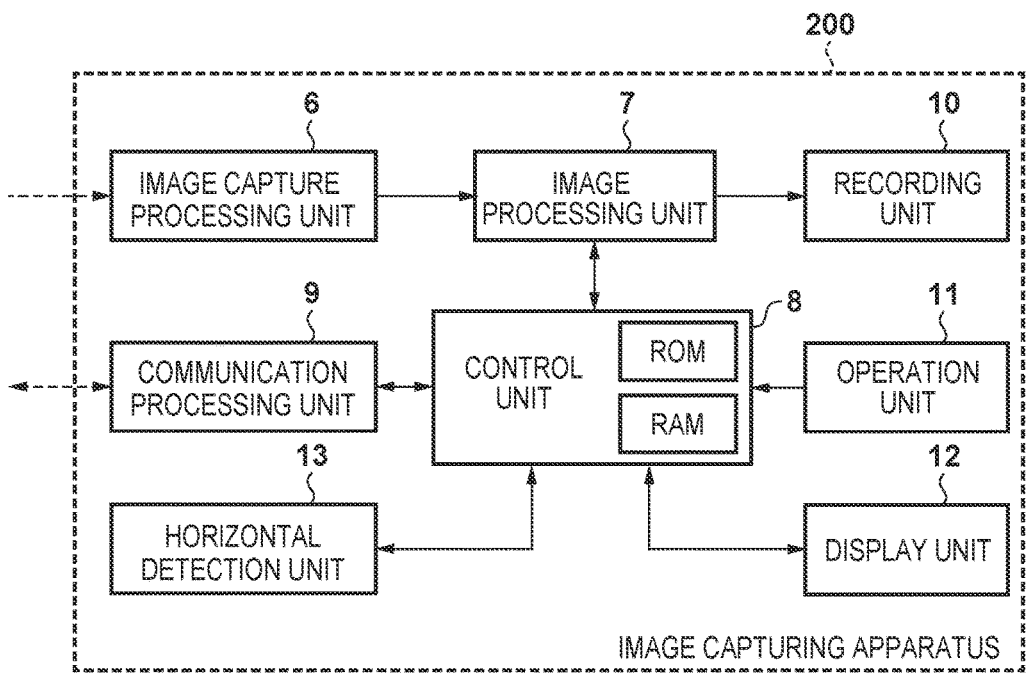

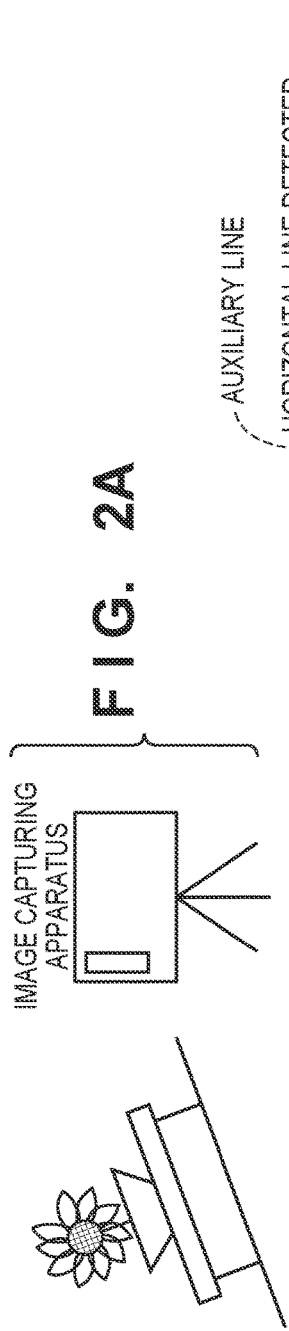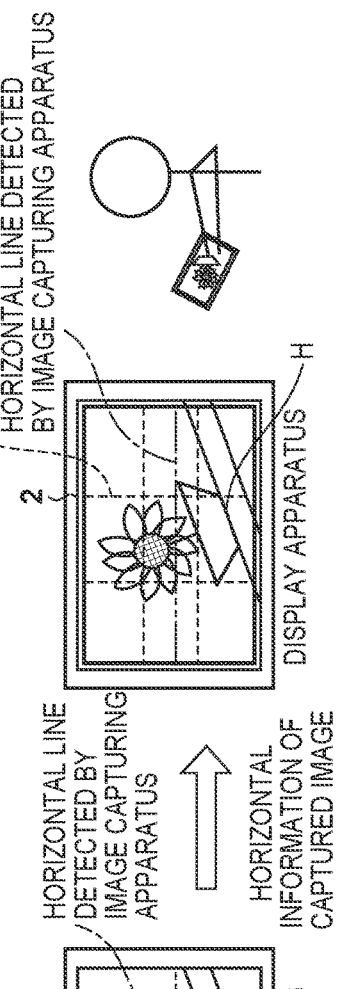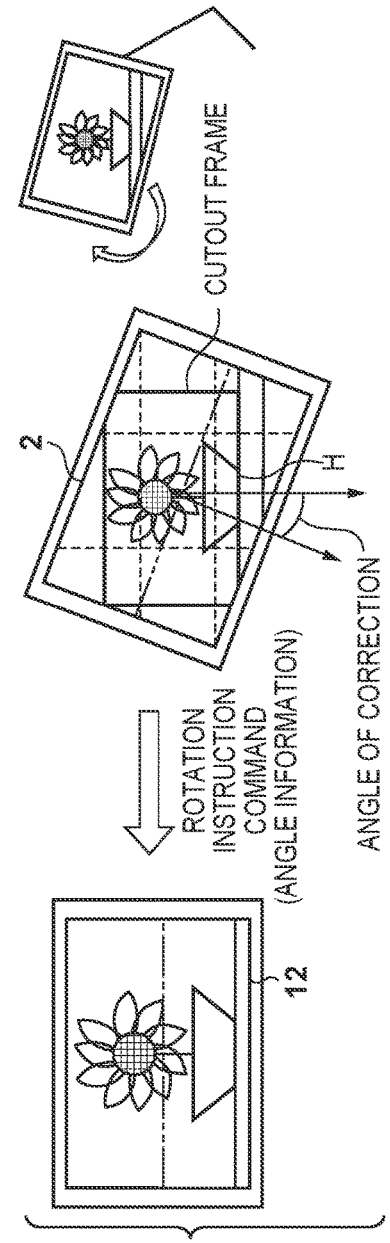

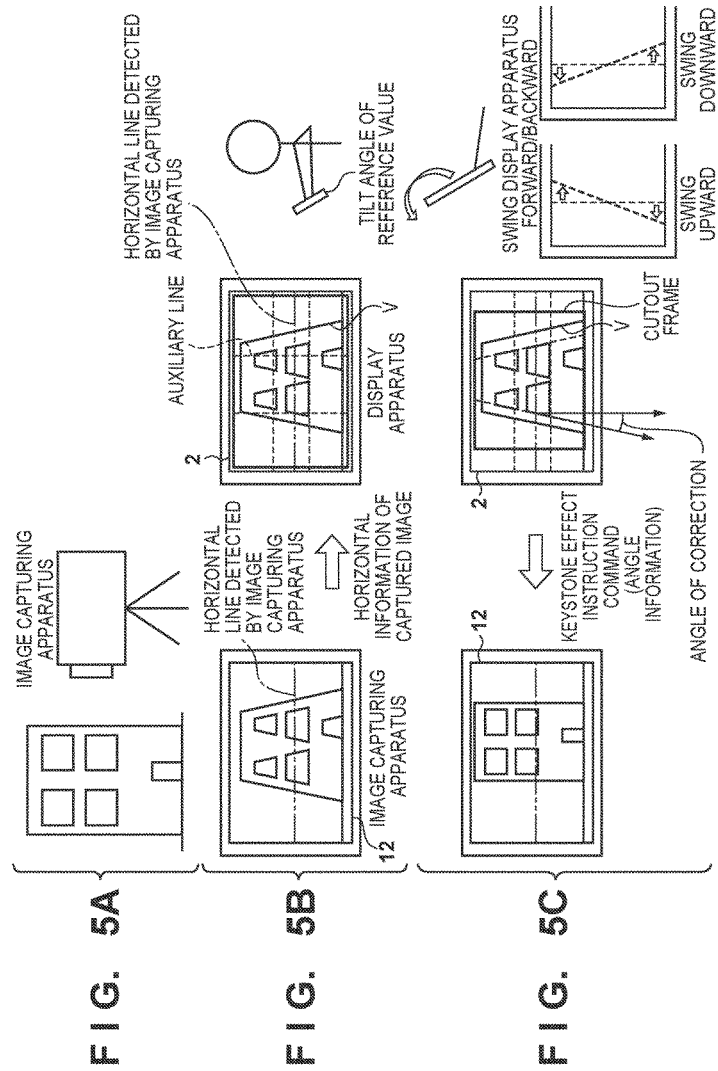

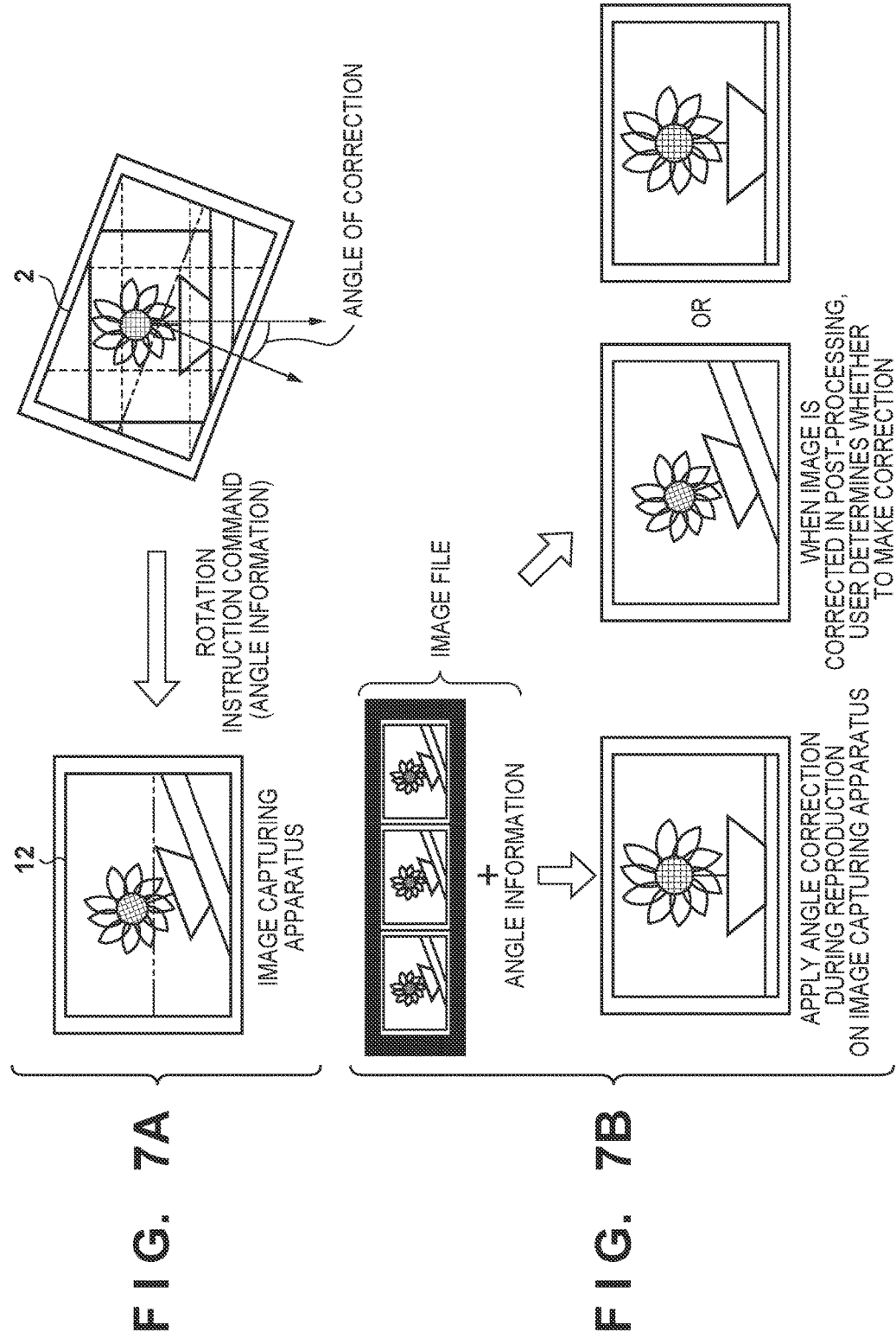

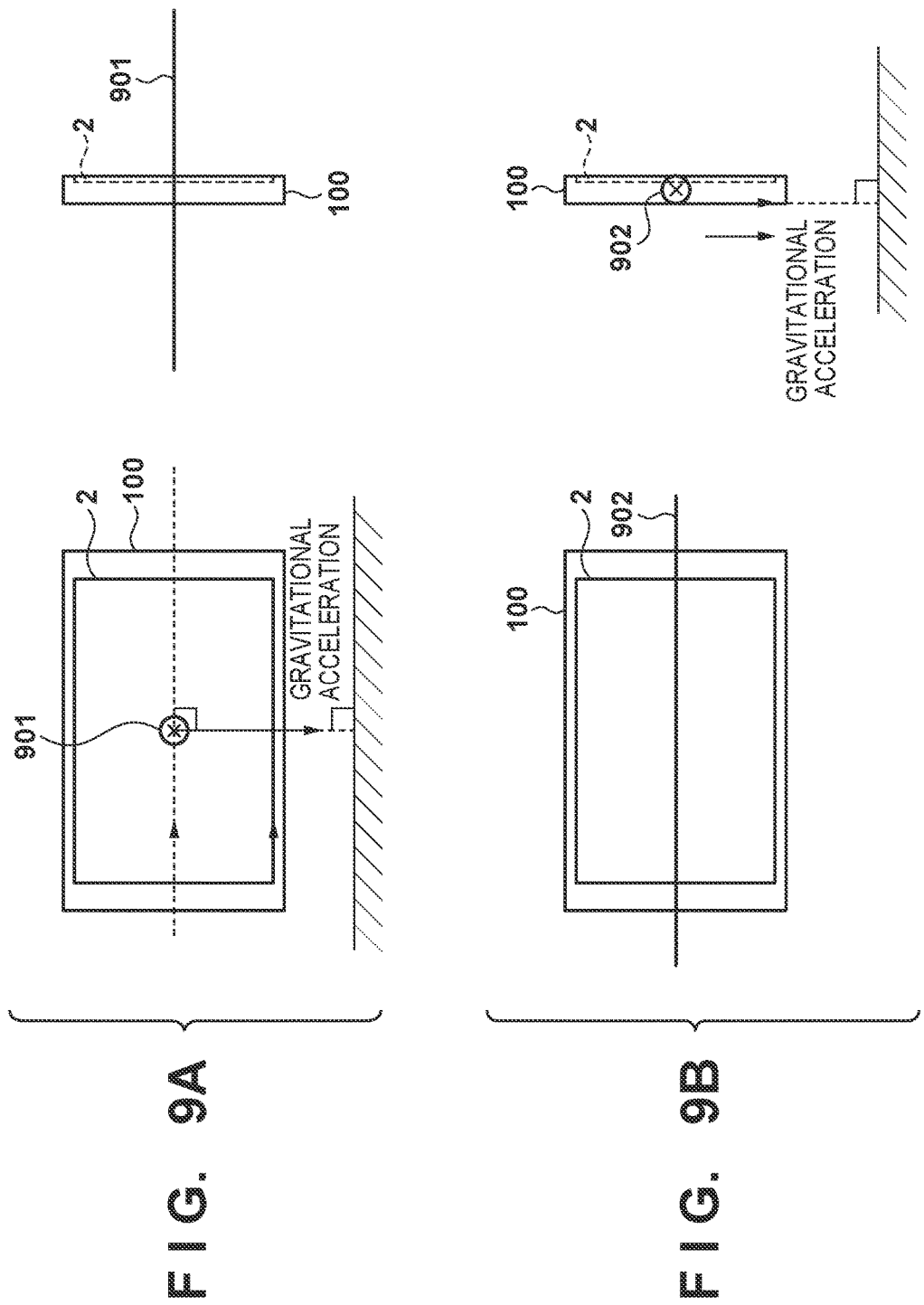

DISPLAY APPARATUS, IMAGE CAPTURING SYSTEM, CONTROL METHOD FOR DISPLAY APPARATUS, AND STORAGE MEDIUM FOR DISPLAYING INFORMATION BASED ON ATTITUDE

BACKGROUND OF THE INVENTION

Field of the Invention

The present invention relates to a display apparatus, an image capturing apparatus, an image capturing system, a control method for the display apparatus, a control method for the image capturing apparatus, and a storage medium.

Description of the Related Art

Recent years have witnessed the development and widespread use of image capturing apparatuses, such as digital still cameras and digital camcorders, which can be remotely operated via external terminals, such as smartphones, using wireless communication functions such as Wi-Fi (Wireless Fidelity). Remote operation functions of such external terminals enable users to operate the image capturing apparatuses from a location far from the image capturing apparatuses. With such functions, the users can not only confirm images captured by the image capturing apparatuses, but also perform shooting start instructions and setting of shooting parameters.

For example, when remotely operating an image capturing apparatus using an external terminal, a user may notice inconsistency between a horizontal direction in an image captured by the image capturing apparatus and a horizontal direction of a subject while confirming the captured image. However, if there is a large distance between a photographer (user) operating the external terminal and the image capturing apparatus, it may be difficult for the user to correct the position and attitude of the image capturing apparatus.

In view of this, a method is suggested in which the angle of view of a captured image is electronically corrected by a user issuing a rotation angle instruction to an image capturing apparatus through a remote operation (see Japanese Patent Laid-Open No. 2007-228097). Another method is also suggested in which a horizontal direction of an image capturing apparatus is electronically and automatically corrected using tilt information of the image capturing apparatus (see Japanese Patent Laid-Open No. 2012-147071).

According to Japanese Patent Laid-Open No. 2007-228097, a tilt of a captured image is electronically corrected by a client terminal transmitting angle information for correcting the tilt of the captured image to an image capturing apparatus connected to a network. With this method, a user determines an angle used in correcting the tilt of the captured image by operating a slide bar displayed on the client terminal. The image capturing apparatus at a remote location receives the angle information, and electronically corrects the captured image. In this way, the tilt of the captured image can be corrected through a remote operation.

According to Japanese Patent Laid-Open No. 2012-147071, an image capturing apparatus detects a tilt angle of itself, and corrects a captured image using detected angle information. This method detects a tilt of the image capturing apparatus itself using, for example, an angle sensor within the image capturing apparatus. The image capturing apparatus electronically corrects the captured image using the detected angle information. In this way, a tilt of the captured image can be automatically corrected.

However, with Japanese Patent Laid-Open No. 2007-228097, it is difficult for the user to intuitively grasp a relationship between an operation amount of the slide bar and a rotation angle, and hence to correct the tilt of the captured image quickly and accurately. On the other hand, Japanese Patent Laid-Open No. 2012-147071 does not support a case in which the image capturing apparatus is level whereas a subject is tilted.

SUMMARY OF THE INVENTION

The present invention has been made in view of the above situations, and provides a technique to enable intuitive correction of a captured image by a user of a display apparatus that receives the captured image from an image capturing apparatus and displays the received captured image.

According to a first aspect of the present invention, there is provided a display apparatus, comprising: a reception unit configured to receive a captured image from an image capturing apparatus; a display unit configured to display the captured image; a detection unit configured to detect an attitude of the display apparatus; and a transmission unit configured to, while the display unit is displaying the captured image, transmit attitude information to the image capturing apparatus in response to an instruction from a user, the attitude information indicating the attitude detected by the detection unit.

According to a second aspect of the present invention, there is provided an image capturing apparatus, comprising: an image capturing unit configured to generate a captured image; a transmission unit configured to transmit the captured image to a display apparatus; a reception unit configured to receive attitude information indicating an attitude of the display apparatus from the display apparatus; and a processing unit configured to apply specific processing to the captured image based on the attitude information received by the reception unit, and record the captured image.

According to a third aspect of the present invention, there is provided an image capturing system including a display apparatus and an image capturing apparatus, the display apparatus comprising: a reception unit configured to receive a captured image from the image capturing apparatus; a display unit configured to display the captured image; a detection unit configured to detect an attitude of the display apparatus; and a transmission unit configured to, while the display unit is displaying the captured image, transmit attitude information to the image capturing apparatus in response to an instruction from a user, the attitude information indicating the attitude detected by the detection unit, the image capturing apparatus comprising: an image capturing unit configured to generate the captured image; a transmission unit configured to transmit the captured image to the display apparatus; a reception unit configured to receive the attitude information indicating the attitude of the display apparatus from the display apparatus; and a processing unit configured to apply specific processing to the captured image based on the attitude information received by the reception unit of the image capturing apparatus, and record the captured image.

According to a fourth aspect of the present invention, there is provided a control method for a display apparatus including a display unit and an attitude detection unit, the control method comprising: receiving a captured image from an image capturing apparatus; displaying the captured image on the display unit; detecting an attitude of the display apparatus with the attitude detection unit; and while displaying the captured image on the display unit, transmitting attitude information to the image capturing apparatus in response to an instruction from a user, the attitude information indicating the attitude detected by the detecting.

According to a fifth aspect of the present invention, there is provided a control method for an image capturing apparatus, the control method comprising: generating a captured image; transmitting the captured image to a display apparatus; receiving attitude information indicating an attitude of the display apparatus from the display apparatus; and applying specific processing to the captured image based on the attitude information received by the receiving, and recording the captured image.

According to a sixth aspect of the present invention, there is provided a display apparatus, comprising: a reception unit configured to receive a captured image from an image capturing apparatus; a display unit configured to display the captured image; a detection unit configured to detect an attitude of the display apparatus; a storage unit configured to, while the display unit is displaying the captured image, store attitude information in response to an instruction from a user, the attitude information indicating the attitude detected by the detection unit; and a processing unit configured to apply specific processing to the captured image received from the image capturing apparatus based on the attitude information stored by the storage unit, and record the captured image.

According to a seventh aspect of the present invention, there is provided a control method for a display apparatus, the control method comprising: receiving a captured image from an image capturing apparatus; displaying the captured image on a display unit of the display apparatus; detecting an attitude of the display apparatus; while displaying the captured image on the display unit, storing attitude information in response to an instruction from a user, the attitude information indicating the attitude detected by the detecting; and applying specific processing to the captured image received from the image capturing apparatus based on the stored attitude information, and recording the captured image.

According to an eighth aspect of the present invention, there is provided a non-transitory computer-readable storage medium which stores a program for causing a computer to function as a display apparatus comprising: a reception unit configured to receive a captured image from an image capturing apparatus; a display unit configured to display the captured image; a detection unit configured to detect an attitude of the display apparatus; and a transmission unit configured to, while the display unit is displaying the captured image, transmit attitude information to the image capturing apparatus in response to an instruction from a user, the attitude information indicating the attitude detected by the detection unit.

According to a ninth aspect of the present invention, there is provided a non-transitory computer-readable storage medium which stores a program for causing a computer to function as an image capturing apparatus, comprising: an image capturing unit configured to generate a captured image; a transmission unit configured to transmit the captured image to a display apparatus; a reception unit configured to receive attitude information indicating an attitude of the display apparatus from the display apparatus; and a processing unit configured to apply specific processing to the captured image based on the attitude information received by the reception unit, and record the captured image.

According to a tenth aspect of the present invention, there is provided a non-transitory computer-readable storage medium which stores a program for causing a computer to function as a display apparatus comprising: a reception unit configured to receive a captured image from an image capturing apparatus; a display unit configured to display the captured image; a detection unit configured to detect an attitude of the display apparatus; a storage unit configured to, while the display unit is displaying the captured image, store attitude information in response to an instruction from a user, the attitude information indicating the attitude detected by the detection unit; and a processing unit configured to apply specific processing to the captured image received from the image capturing apparatus based on the attitude information stored by the storage unit, and record the captured image.

Further features of the present invention will become apparent from the following description of exemplary embodiments with reference to the attached drawings.

BRIEF DESCRIPTION OF THE DRAWINGS

FIG. 1 is a block diagram showing schematic configurations of a display apparatus 100 and an image capturing apparatus 200.

FIGS. 2A to 2C show an overview of a first embodiment.

FIGS. 5A to 5C show an overview of a second embodiment.

FIGS. 7A and 7B show an overview of a third embodiment.

FIG. 9A shows a rotation axis 901 of the display apparatus 100 according to the first embodiment.

FIG. 9B shows a rotation axis 902 of the display apparatus 100 according to the second embodiment.

DESCRIPTION OF THE EMBODIMENTS

Figure 3A:
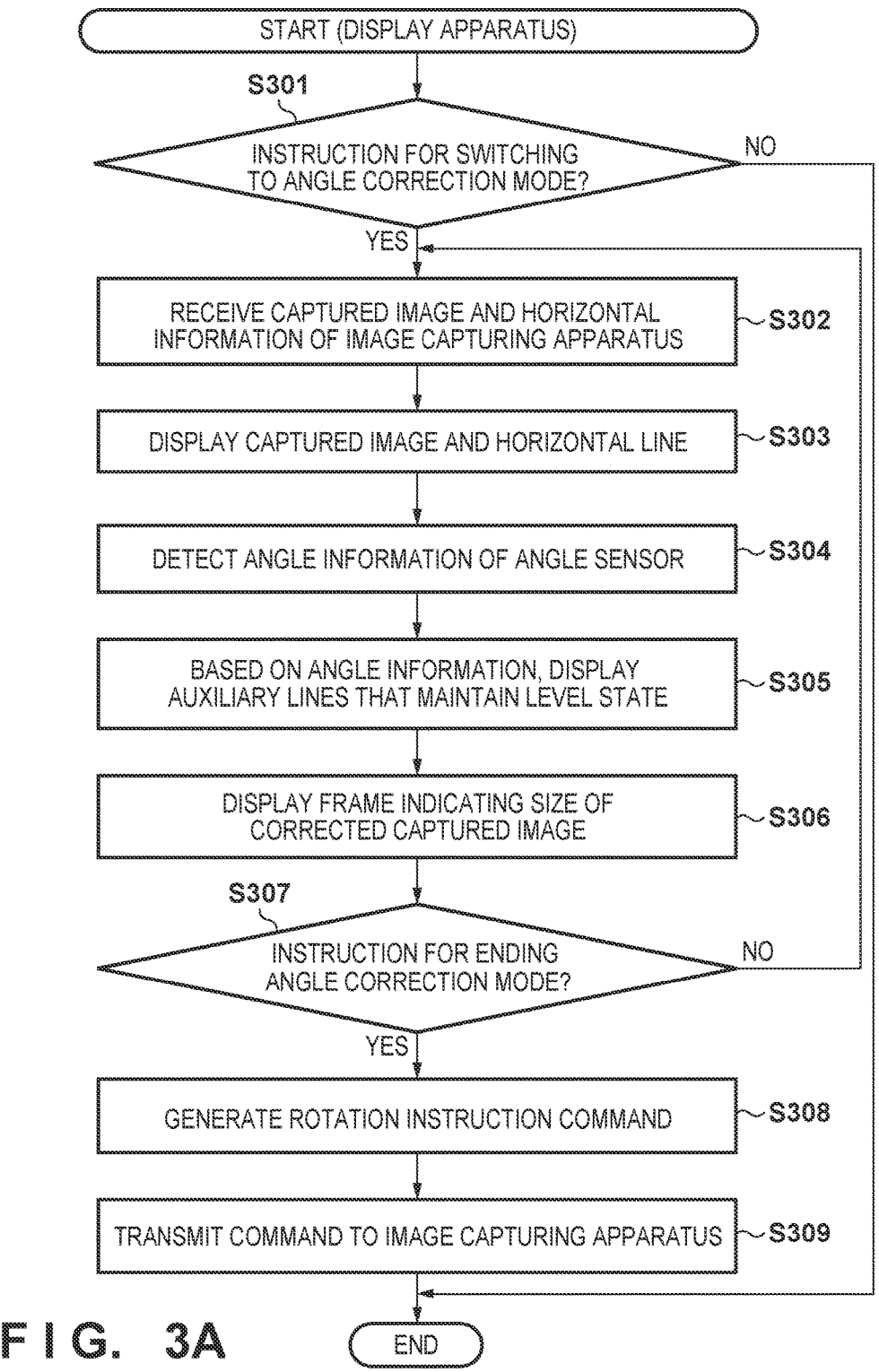
FIGS. 3A and 3B are flowcharts showing operations of the display apparatus 100 and the image capturing apparatus 200 according to the first embodiment.

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

FIG. 1 is a block diagram showing schematic configurations of a display apparatus 100 and an image capturing apparatus 200 included in each of image capturing systems according to the embodiments. The display apparatus 100 is, for example, a mobile terminal (e.g., a smartphone) that can be held in a hand of a user, and is used by the user to remotely operate the image capturing apparatus 200. The image capturing apparatus 200 is, for example, a digital camera, and has a function of correcting a tilt and a keystone effect of a captured image through electronic image processing.

With the aid of a communication processing unit 1, the display apparatus 100 communicates with the image capturing apparatus 200 connected to a network. The display apparatus 100 receives an image captured by the image capturing apparatus 200 via the network. The display apparatus 100 also transmits attitude information indicating an attitude of the display apparatus 100 to the image capturing apparatus 200. In the embodiments described below, it will be assumed that an angle of the display apparatus 100 is used as an attitude of the display apparatus 100, and attitude information is also referred to as angle information. The display apparatus 100 receives an image captured by the image capturing apparatus 200 with the aid of the communication processing unit 1, and displays the received captured image on a display unit 2. At this time, a display processing unit 3 converts the captured image into information that can be displayed on the display unit 2 of the display apparatus 100. The display processing unit 3 also generates display data for displaying the angle information of the display apparatus 100 on the display unit 2. An angle detection unit 4 (attitude detection unit) detects a positional attitude of the display apparatus 100, and converts the result of detection into the angle information. An acceleration sensor, a gyroscope, or the like can be used as the angle detection unit 4. A control unit 5 includes a nonvolatile ROM and a volatile RAM, and controls the display apparatus 100 by executing a control program stored in the ROM. The RAM in the control unit 5 is used as a working memory for execution of the control program by the control unit 5. Although FIG. 1 shows the display processing unit 3 as an independent block, the control unit 5 may execute processing of the display processing unit 3.

The image capturing apparatus 200 obtains captured image data by capturing an image of a subject with the aid of an image sensor included in an image capture processing unit 6. An image processing unit 7 generates a captured image based on the captured image data. The image processing unit 7 also electronically corrects the captured image based on the angle information received from the display apparatus 100 via a communication processing unit 9. The captured image is recorded to a recording unit 10. The image capturing apparatus 200 also includes an operation unit 11 for performing a shooting operation, configuring menu settings, and the like on the image capturing apparatus 200, as well as a display unit 12 for confirming the captured image, shooting information, and the like. The image capturing apparatus 200 further includes the communication processing unit 9 for transmitting the captured image to the display apparatus 100, or for receiving the angle information of the display apparatus 100. A control unit 8 includes a nonvolatile ROM and a volatile RAM, and controls the image capturing apparatus 200 by executing a control program stored in the ROM. The RAM in the control unit 8 is used as a working memory for execution of the control program by the control unit 8.

Constituent elements of the image capturing apparatus 200 will now be described in more detail. The image capture processing unit 6 is composed of an optical unit including a plurality of lenses, a diaphragm, and the like, the image sensor, a driver for driving the image sensor, a timing generation circuit, a CDS/AGC circuit, and the like. The optical unit includes the diaphragm for adjusting an amount of incident light from outside, and a neutral density (ND) filter. The image capture processing unit 6 drives a lens assembly with respect to an optical axis so as to, for example, focus on the subject and reduce blur in the captured image caused by a hand shake and the like. The image sensor captures an image of the subject through photoelectric conversion, and with the use of the CDS/AGC circuit, samples and amplifies image information based on electric charges (image signals) accumulated in pixels of the image sensor. Note that correlated double sampling (CDS) and auto gain control (AGC) are performed in sampling and amplification, respectively. An A/D converter converts the image information (analog signal) output from the CDS/AGC circuit into a digital signal. The image processing unit 7 applies various types of signal processing, including auto white balance (AWB) and gamma control etc., to the image information (digital signal) output from the A/D converter, thereby generating the captured image. The driver for driving the image sensor and the timing generation circuit feed, for example, driving pulses for driving the image sensor to the image sensor, and adjust readout of the image captured by the image sensor and an exposure time period.

As stated earlier, the image processing unit 7 electronically corrects the captured image based on the angle information of the display apparatus 100 received via the communication processing unit 9. It will be assumed that a correction in a direction of rotation and a direction of a keystone effect is performed through image processing.

The recording unit 10 stores the captured image generated by the image processing unit 7 as an image file to an internal memory or an external memory (recording medium), such as a memory card. At this time, the recording unit 10 can write the angle information received via the communication processing unit 9 to the image file.

With the use of the operation unit 11, the user performs a key operation and configures setting menus and the like when shooting with the image capturing apparatus 200. The display unit 12 displays a display image generated by the image processing unit 7. A horizontal detection unit 13 detects a tilt of the image capturing apparatus 200 and outputs angle information. An acceleration sensor, a gyroscope, or the like can be used as the horizontal detection unit 13.

Note that in FIG. 1, each block is illustrated as an independent circuit unit. Alternatively, all or a part of the blocks may be included in the control unit 5 or the control unit 8.

First Embodiment

First, an overview of a first embodiment will be described with reference to FIGS. 2A to 2C. As shown in FIG. 2A, the image capturing apparatus 200 is placed so as to capture an image of a subject. The image processing unit 7 generates a captured image from captured image data obtained by the image capture processing unit 6. In an example of FIG. 2A, the image capturing apparatus 200 is placed to be level with respect to a ground surface. From a viewpoint of the image capturing apparatus 200, a direction that is "level with respect to the ground surface" means a direction that is perpendicular to a gravitational direction detected by the horizontal detection unit 13 of the image capturing apparatus 200; hereinafter, it may be simply referred to as a "horizontal direction detected by the image capturing apparatus 200". On the other hand, the subject is placed on a slanted surface in a tilted manner.

As shown in FIG. 2B, the image capturing apparatus 200 displays the captured image on the display unit 12. The image capturing apparatus 200 also displays, on the display unit 12, a horizontal line (a horizontal line of the image capturing apparatus 200) based on angle information output from the horizontal detection unit 13. As the image capturing apparatus 200 is placed to be level with respect to the ground surface as stated earlier, the horizontal line is parallel to a transverse direction of the captured image. As the subject is placed on the slanted surface in a tilted manner as stated earlier, the subject included in the captured image is also tilted in FIG. 2B.

Although the image capturing apparatus 200 is level with respect to the ground surface in the description of the present embodiment, the image capturing apparatus 200 is not limited to having such an attitude. The image capturing apparatus 200 may be placed in such a manner that it is tilted with respect to the ground surface. In this case, the horizontal line is displayed in a tilted manner, with its tilt corresponding to a tilt detected by the horizontal detection unit 13 of the image capturing apparatus 200 (that is to say, the displayed horizontal line is at an angle to the transverse direction of the captured image).

The image capturing apparatus 200 transmits the captured image to the communication processing unit 1 of the display apparatus 100 connected to the network via the communication processing unit 9. At this time, the image capturing apparatus 200 transmits information indicating an attitude of the image capturing apparatus 200 together with the captured image. It will be assumed that information indicating the horizontal direction of the image capturing apparatus 200 (horizontal information, image capturing apparatus attitude information), which is obtained based on the angle information output from the horizontal detection unit 13, is transmitted as the information indicating the attitude of the image capturing apparatus 200. As shown in FIG. 2B, the display apparatus 100 converts the captured image received from the image capturing apparatus 200 via the communication processing unit 1 into a format that can be displayed on the display unit 2 with the aid of the display processing unit 3, and displays the result of conversion on the display unit 2.

A photographer (user) determines angle information for correcting the tilt of the captured image by rotating the display apparatus 100 while confirming the captured image being displayed on the display unit 2. This rotation is performed around a rotation axis orthogonal to a display screen of the display unit 2 (see a rotation axis 901 in FIG. 9A). For example, a rotation angle of a case in which a transverse line (a line extending in a left-right direction) of the display screen is level with respect to the ground surface, as shown on the left side of FIG. 9A, is defined as 0 degrees. From a viewpoint of the display screen (or display apparatus 100), a direction that is "level with respect to the ground surface" means a direction perpendicular to a gravitational direction detected by the angle detection unit 4 of the display apparatus 100; hereinafter, it may also be simply referred to as a "horizontal direction detected by the display apparatus 100". Thus, when the rotation angle is 0 degrees, horizontal auxiliary lines are parallel to the transverse line of the display screen (as will be elaborated later, the horizontal auxiliary lines are lines extending in a transverse direction among auxiliary lines shown in FIG. 2B). The "tilt of the captured image" to be corrected denotes "deviation" from the horizontal auxiliary lines of the display apparatus 100 caused by rotation of the captured image around the rotation axis.

When the user rotates the display apparatus 100, the display unit 2 displays the horizontal line based on the horizontal information received from the image capturing apparatus 200 and auxiliary information indicating the rotation angle (attitude) of the display apparatus 100, together with the captured image. In the present embodiment, it will be assumed that the auxiliary information denotes grid-like auxiliary lines including horizontal auxiliary lines and vertical auxiliary lines. An angle formed by the horizontal auxiliary lines and the transverse line of the display screen corresponds to the rotation angle of the display apparatus 100. The horizontal line and the auxiliary lines are generated by the display processing unit 3. Based on angle information detected by the angle detection unit 4, the display processing unit 3 updates display so that the horizontal auxiliary lines keep showing the horizontal direction detected by the display apparatus 100 even when the display apparatus 100 has been rotated. In this way, the user can confirm the horizontal direction detected by the display apparatus 100 by viewing the horizontal auxiliary lines.

To correct the tilt of the captured image, the user determines a line that belongs to the subject included in the captured image and that should match the horizontal direction detected by the display apparatus 100. In an example of FIG. 2B, a line on which a bottom surface of a flower pot is in contact with a board on which the flower pot is placed (a subject's horizontal line H) is the line that should match the horizontal direction detected by the display apparatus 100. Then, as shown in FIG. 2C, the user rotates the display apparatus 100 so that the subject's horizontal line H matches the horizontal direction detected by the display apparatus 100. At this time, the user can easily correct the tilt (level the subject) of the captured image by rotating the display apparatus 100 so that the subject's horizontal line H is parallel to the horizontal auxiliary lines. Note that the horizontal auxiliary lines are not essential in the present embodiment. Even if the horizontal auxiliary lines are not displayed, the user can level the subject by rotating the display apparatus 100 while viewing the captured image (especially, the subject's horizontal line H) displayed on the display unit 2.

Note that the present embodiment is described under the assumption that, while the image capturing apparatus 200 is placed to be level with respect to the ground surface, the subject is tilted, thus causing the tilt of the captured image. However, the image capturing apparatus 200 and the subject are not limited to having such attitudes. For example, as stated earlier, in a case where the image capturing apparatus 200 is tilted, the horizontal line of the image capturing apparatus 200 is displayed in a tilted manner in FIG. 2B, with its tilt corresponding to a tilt detected by the horizontal detection unit 13 of the image capturing apparatus 200 (that is to say, the displayed horizontal line is at an angle to the transverse direction of the captured image). In this case, the user can correct the tilt of the captured image attributed to the tilt of the image capturing apparatus 200 by rotating the display apparatus 100 so that the horizontal line of the image capturing apparatus 200 is parallel to the horizontal auxiliary lines. Being able to make such correction is a significant advantage in the case of, for example, remote shooting using the display apparatus 100 while the image capturing apparatus 200 is fixed in place by a tripod.

On the other hand, in a case where the user wishes to correct the attitude of the subject to a desired attitude irrespective of the attitude of the image capturing apparatus 200 (the tilt thereof with respect to the ground surface), the user need not use the horizontal line of the image capturing apparatus 200. In this case, it is sufficient for the user to rotate the display apparatus 100 based on the subject's horizontal line H as stated earlier. Depending on the subject types, there may be no element that is equivalent to the subject's horizontal line H; in this case also, the user can correct the captured image by rotating the display apparatus 100 so that a desired portion of the subject has a desired attitude.

After the user has rotated the display apparatus 100, the display apparatus 100 transmits a rotation instruction command to the image capturing apparatus 200 via the communication processing unit 1 in response to a user instruction. The rotation instruction command includes information indicating the rotation angle of the display apparatus 100 (angle information). The image capturing apparatus 200 receives the rotation instruction command including the angle information via the communication processing unit 9. Then, the image capturing apparatus 200 applies angle correction (tilt correction) to the captured image by executing electronic image processing with the aid of the image processing unit 7. In a case where correction is made through image processing, the image capturing apparatus 200 cuts out a partial region of the captured image. However, the larger the angle of correction, the smaller the region that needs to be cut out from the captured image. In view of this, with the aid of the control unit 5, the display apparatus 100 analyzes an image size of the captured image received from the image capturing apparatus 200. With the aid of the control unit 5, the display apparatus 100 also calculates a cutout image size within the captured image, which is necessary for correction, based on the angle information detected by the angle detection unit 4, thereby identifying the partial region to be cut out. The display apparatus 100 notifies the user of information indicating the identified partial region (cutout frame) by superimposing the information on the display unit 2 via the display processing unit 3.

With the above control, the user can correct the tilt of the image captured by the image capturing apparatus 200 through an intuitive operation by rotating the display apparatus 100.

Figure 3B:
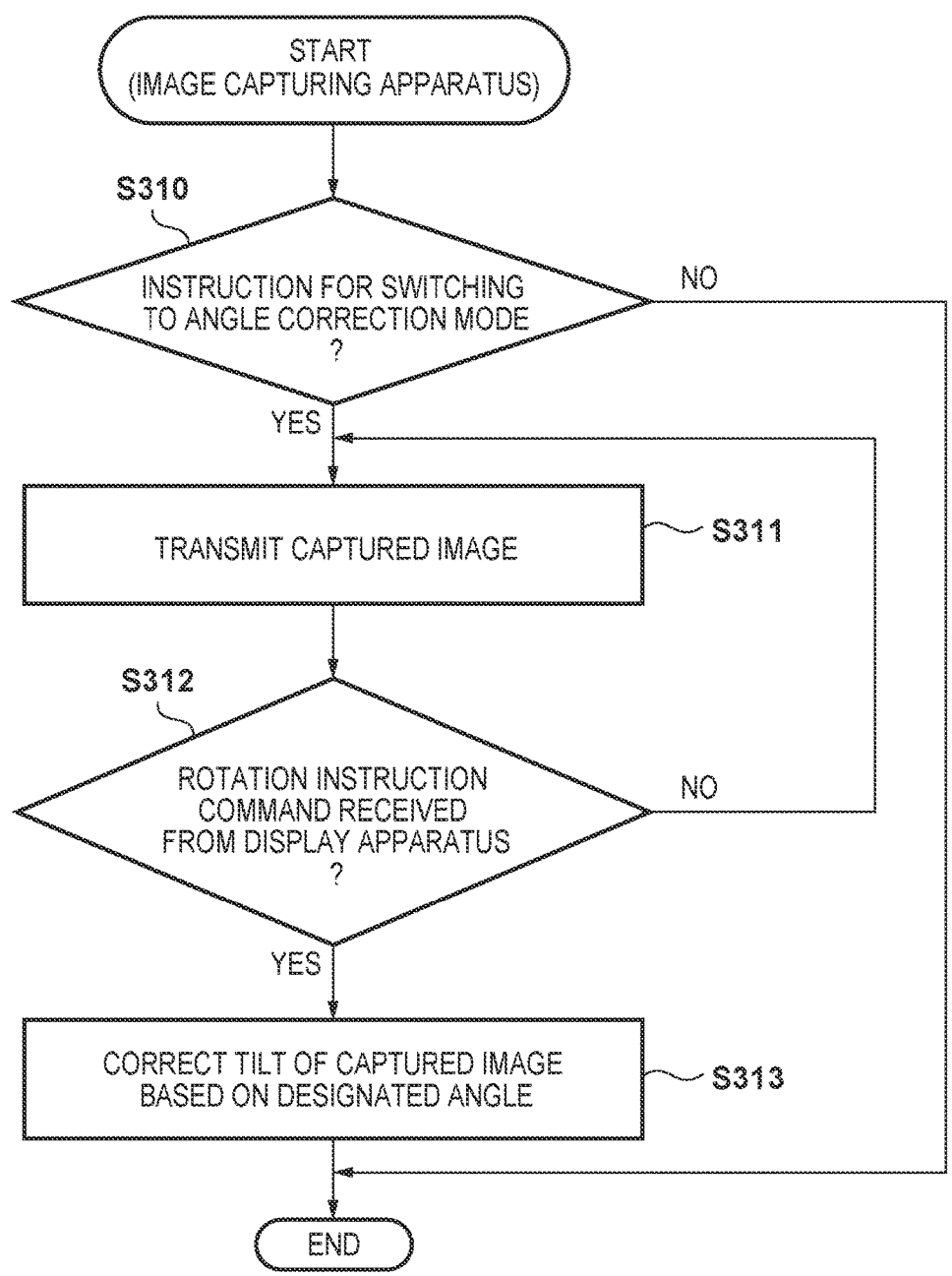

A description is now given of operations of the display apparatus 100 and the image capturing apparatus 200 according to the first embodiment with reference to FIGS. 3A and 3B. FIGS. 3A and 3B pertain to the display apparatus 100 and the image capturing apparatus 200, respectively. Processes of steps in a flowchart of FIG. 3A are realized as a result of the control unit 5 controlling blocks of the display apparatus 100 by deploying the control program stored in the ROM to the RAM and executing the deployed control program, unless specifically stated otherwise. Similarly, processes of steps in a flowchart of FIG. 3B are realized as a result of the control unit 8 controlling blocks of the image capturing apparatus 200 by deploying the control program stored in the ROM to the RAM and executing the deployed control program, unless specifically stated otherwise. The same goes for later-described FIGS. 4A and 4B.

First, the operations of the display apparatus 100 shown in FIG. 3A will be described. In step S301, the control unit 5 of the display apparatus 100 determines whether the user has issued an instruction for switching to an angle correction mode. If the instruction for switching to the angle correction mode has not been issued, processing of the present flowchart is ended. If the instruction for switching to the angle correction mode has been issued, the processing proceeds to step S302.

In step S302, the control unit 5 receives, via the communication processing unit 1, an image captured by the image capturing apparatus 200 and horizontal information of the image capturing apparatus 200 (see FIG. 2B). In step S303, the display processing unit 3 displays the captured image that was received from the image capturing apparatus 200 in step S302 on the display unit 2. The display processing unit 3 also generates an image of a horizontal line based on the horizontal information, and displays the horizontal line by superimposing the horizontal line over the captured image displayed on the display unit 2 (see FIG. 2B).

In step S304, the control unit 5 detects angle information output from the angle detection unit 4. This angle information indicates a rotation angle around the rotation axis orthogonal to the display screen of the display unit 2 (see the rotation axis 901 in FIG. 9A). In step S305, based on the angle information detected in step S304, the control unit 5 generates grid-like auxiliary lines that are used to confirm a horizontal direction detected by the display apparatus 100, and hence are used by the user as a guide for correction of the captured image. Then, the display processing unit 3 displays the auxiliary lines by superimposing the auxiliary lines over the captured image displayed on the display unit 2. As shown in FIG. 2C, transverse lines among these grid-like auxiliary lines (horizontal auxiliary lines) are displayed in such a manner that they are always maintained level (parallel to the horizontal direction detected by the display apparatus 100), even when the rotation angle of the display apparatus 100 has been changed. The user adjusts the rotation angle of the display apparatus 100 so that the horizontal auxiliary lines match a horizontal portion of a subject being shot (e.g., the subject's horizontal line H shown in FIGS. 2B and 2C). In this way, the user can easily generate correction information for shooting the subject as if the subject is level.

In step S306, the display processing unit 3 displays, on the display unit 2, information (cutout frame) indicating a cutout size within the captured image for making correction in accordance with the rotation angle of the display apparatus 100 (see FIG. 2C). As stated earlier with reference to FIG. 2C, the cutout size is calculated by the control unit 5 based on the angle information detected by the angle detection unit 4. The larger the rotation angle, i.e., a correction amount, the smaller the cutout size; by viewing the cutout frame, the user can rotate the display apparatus 100 while confirming how small the captured image will be.

In step S307, the control unit 5 determines whether the user has issued an instruction for ending the angle correction mode. If the instruction for ending the angle correction mode has not been issued, the processing returns to step S302, and similar processes are repeated. If the instruction for ending the angle correction mode has been issued, the processing proceeds to step S308.

In step S308, the control unit 5 generates a rotation instruction command to be issued to the image capturing apparatus 200. The rotation instruction command includes angle information for electronic image correction by the image capturing apparatus 200. It will be assumed that the rotation instruction command includes, for example, information indicating the gravitational direction detected by the angle detection unit 4, or information related to an angle (orientation) with respect to the gravitational direction around the rotation axis orthogonal to a display surface of the display unit 2. In step S309, the control unit 5 transmits the rotation instruction command to the image capturing apparatus 200 via the communication processing unit 1, and then the processing of the present flowchart is ended. Thereafter, the captured image that has been corrected in response to the rotation instruction command can be received from the image capturing apparatus 200 and displayed on the display unit 2. In this way, the user of the display apparatus 100 can confirm whether an intended orientation has been achieved through correction, and perform a correction operation again by switching back to the angle correction mode if necessary.

Next, the operations of the image capturing apparatus 200 shown in FIG. 3B will be described. In step S310, the control unit 8 of the image capturing apparatus 200 determines whether the user has issued the instruction for switching to the angle correction mode. This switching instruction is, for example, remotely issued via the display apparatus 100. If the instruction for switching to the angle correction mode has not been issued, processing of the present flowchart is ended. If the instruction for switching to the angle correction mode has been issued, the processing proceeds to step S311.

In step S311, the control unit 8 transmits the captured image to the display apparatus 100 via the communication processing unit 9. It also transmits, to the display apparatus 100, the above-described horizontal information detected by the horizontal detection unit 13, which indicates the attitude of the image capturing apparatus 200. In step S312, the control unit 8 determines whether the rotation instruction command has been received from the display apparatus 100. If the rotation instruction command has not been received, the processing returns to step S311, and similar processes are repeated. These processes are repeated in a cycle of a predetermined frame rate (e.g., 30 fps) so that captured images are visible in the form of live view on the display apparatus 100. If the rotation instruction command has been received, the processing proceeds to step S313.

In step S313, the image processing unit 7 corrects a tilt of the captured image by executing electronic image processing based on the angle information included in the rotation instruction command. The captured image, whose tilt has been corrected, is transmitted to the display apparatus 100 to be reviewed on the display apparatus 100. Furthermore, information for correction, including the angle information in the rotation instruction command, is stored (recorded) to the ROM or RAM in the image capturing apparatus 200, and then the processing of the present flowchart is ended. Thereafter, when the image capturing apparatus 200 captures still images or moving images and records or transmits the captured images, the image processing unit 7 makes correction based on the stored information (the information for correction, including the angle information in the rotation instruction command). Then, the corrected captured images are recorded to the recording unit 10, or transmitted via the communication processing unit 9, as still images or moving images. That is to say, a plurality of images that are captured after receiving the rotation instruction command are corrected based on the stored information.

Through the above processing, the tilted captured image shown in FIG. 2B is corrected in accordance with the rotation angle of the display apparatus 100 as shown in FIG. 2C.

Figure 4A:
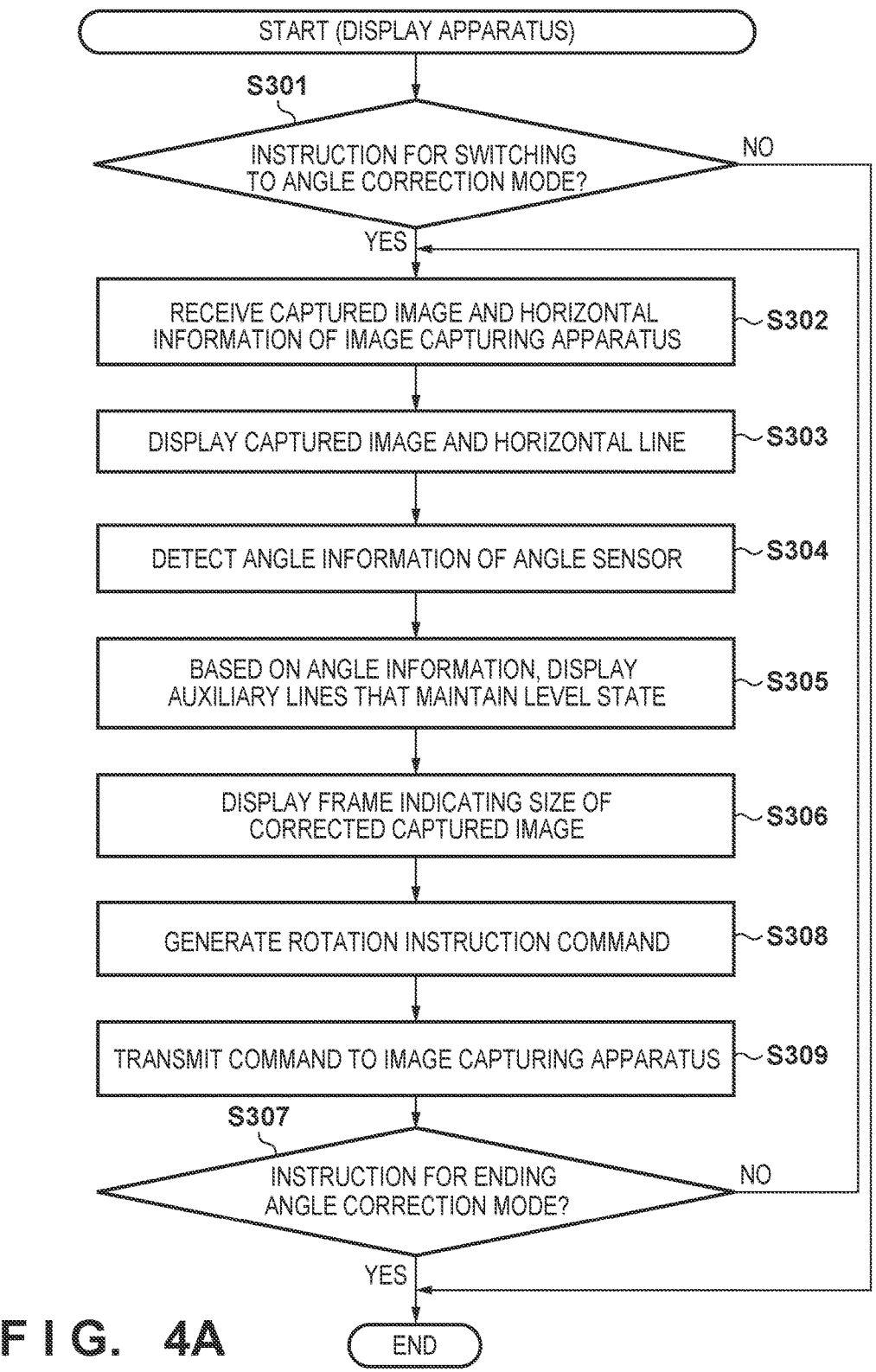
FIGS. 4A and 4B are flowcharts showing a modification example of FIGS. 3A and 3B.
Figure 4B:
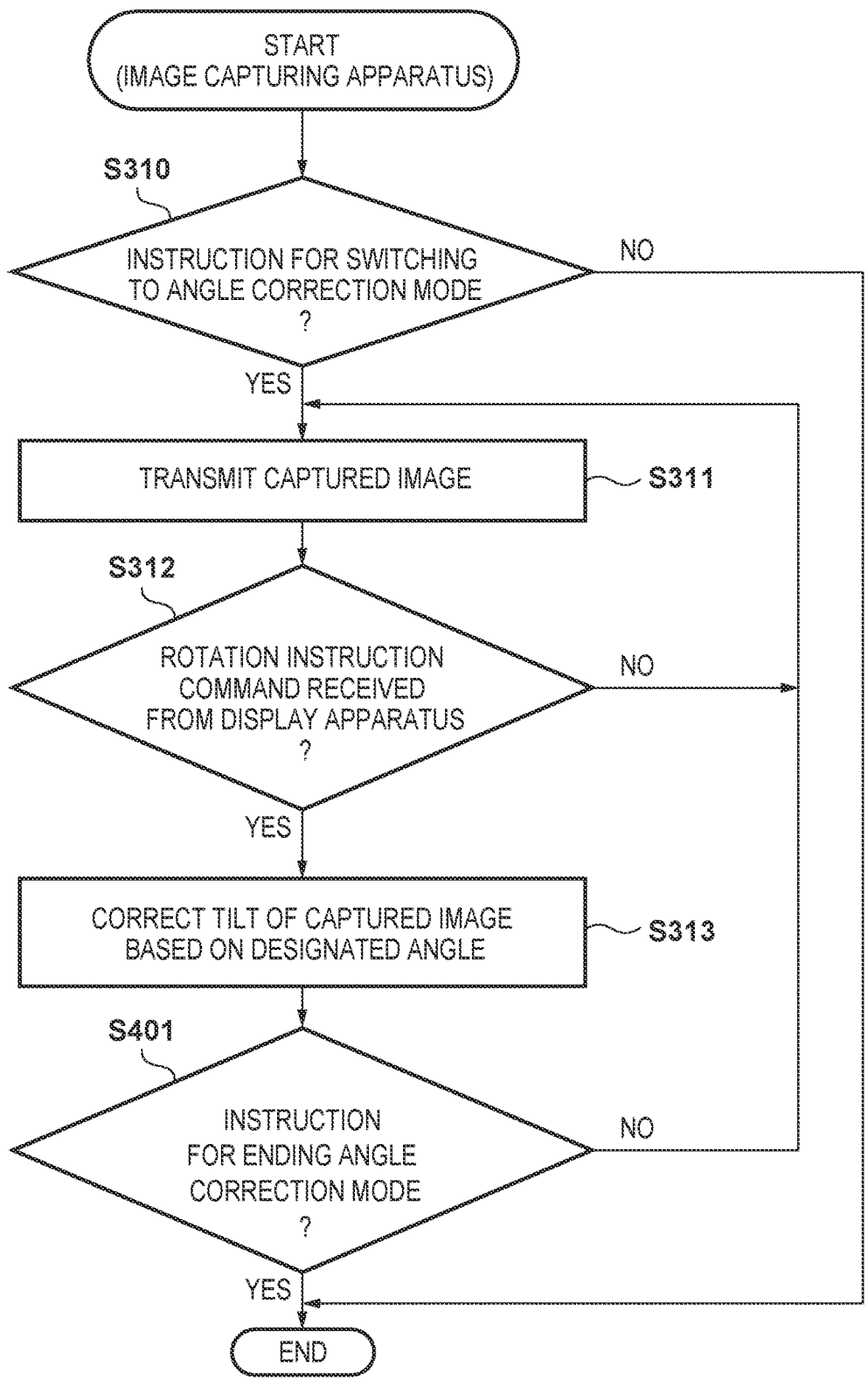

Incidentally, in the flowcharts of FIGS. 3A and 3B, the display apparatus 100 transmits the rotation instruction command to the image capturing apparatus 200 after the issuance of the instruction for ending the angle correction mode in step S307. In this way, once the angle correction mode has been ended following the adjustment of the angle of correction, the same correction can be repeatedly applied to images shot thereafter. On the other hand, as shown in FIGS. 4A and 4B, the display apparatus 100 may generate the rotation instruction command and transmit the rotation instruction command to the image capturing apparatus 200 in real time without waiting for the instruction for ending the angle correction mode. In this way, the image capturing apparatus 200 can correct captured images immediately following rotation of the display apparatus 100. In FIGS. 4A and 4B, which respectively correspond to FIGS. 3A and 3B, steps of performing processes that are identical or similar to processes of FIGS. 3A and 3B are given the same reference numerals thereas. FIG. 4A is the same as FIG. 3A, except that steps S308 and S309 precede step S307. FIG. 4B is the same as FIG. 3B, except that step S401 is added after step S313. In step S401, the control unit 8 determines whether the user has issued the instruction for ending the angle correction mode. This ending instruction is, for example, remotely issued via the display apparatus 100. If the instruction for ending the angle correction mode has not been issued, processing returns to step S311, and similar processes are repeated. If the instruction for ending the angle correction mode has been issued, information for correction, including the angle information in the rotation instruction command, is stored (recorded) to the ROM or RAM in the image capturing apparatus 200, and then the processing of the present flowchart is ended. Thereafter, when the image capturing apparatus 200 captures still images or moving images and records or transmits the captured images, the image processing unit 7 makes correction based on the stored information (the information for correction, including the angle information in the rotation instruction command). Then, the corrected captured images are recorded to the recording unit 10, or transmitted via the communication processing unit 9, as still images or moving images.

As described above, in the first embodiment, the display apparatus 100 displays a captured image received from the image capturing apparatus 200 on the display unit 2. Then, the display apparatus 100 transmits angle information indicating a rotation angle of the display apparatus 100 (a rotation angle around the rotation axis orthogonal to the display screen of the display unit 2) to the image capturing apparatus 200. The image capturing apparatus 200 corrects a tilt of the captured image in accordance with the angle information.

In this way, the user of the display apparatus, which receives the captured image from the image capturing apparatus and displays the received captured image, can correct the captured image intuitively.

Second Embodiment

The first embodiment has described a configuration in which a tilt of an image captured by the image capturing apparatus 200 is electronically corrected using angle information indicating a rotation angle of the display apparatus 100. The second embodiment describes a configuration in which a keystone effect of a captured image is corrected by the user tilting the display apparatus 100 forward and backward. Basic configurations of the display apparatus 100 and the image capturing apparatus 200 according to the second embodiment are similar to the configurations shown in FIG. 1 according to the first embodiment, and thus a detailed description of such configurations will be omitted. The following description focuses mainly on portions that differ from the first embodiment.

First, an overview of the second embodiment will be described with reference to FIGS. 5A to 5C. The second embodiment is similar to the first embodiment in that a captured image is corrected in accordance with an angle of the display apparatus 100. However, in the second embodiment, an "angle of the display apparatus 100" corresponds to a forward/backward tilt angle of the display apparatus 100 (strictly speaking, a forward/backward tilt angle of the display screen of the display unit 2). The "forward/backward tilt" mentioned here corresponds to rotation of the display screen around a rotation axis that is in plane with the display screen of the display unit 2 and parallel to a transverse line of the display screen (see a rotation axis 902 in FIG. 9B). For example, a tilt angle of a case in which an up-down line (a line extending in an up-down direction) of the display screen is perpendicular to the ground surface, as shown on the right side of FIG. 9B, is defined as 0 degrees. From a viewpoint of the display screen (or display apparatus 100), a direction that is "perpendicular to the ground surface" means the gravitational direction detected by the angle detection unit 4 of the display apparatus 100. As shown in FIG. 5C, the display apparatus 100 transmits a keystone effect instruction command including the angle information to the image capturing apparatus 200. The image capturing apparatus 200 corrects a keystone effect by correcting a captured image in accordance with the angle information.

Figure 6A:
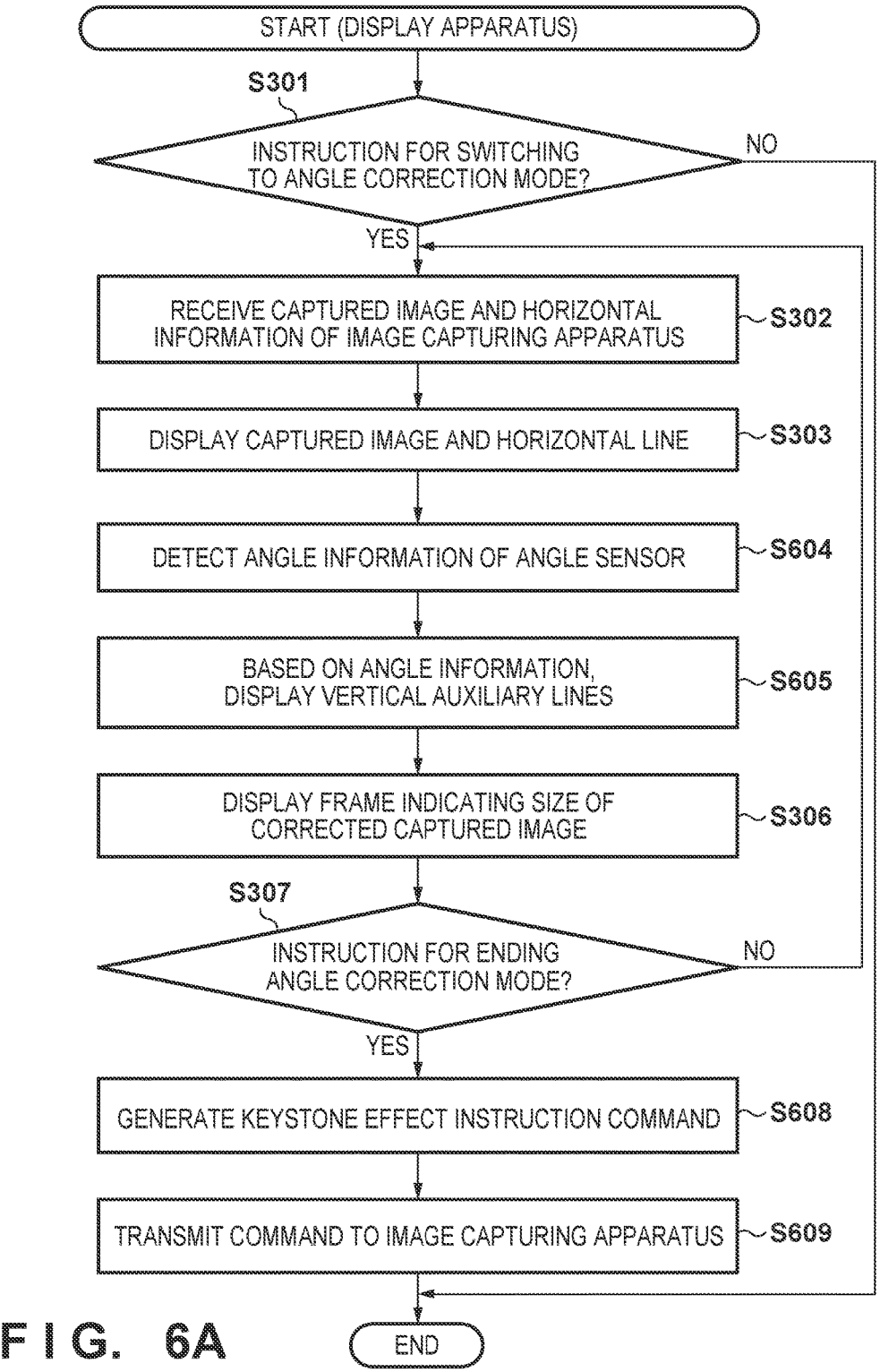
FIGS. 6A and 6B are flowcharts showing operations of the display apparatus 100 and the image capturing apparatus 200 according to the second embodiment.
Figure 6B:
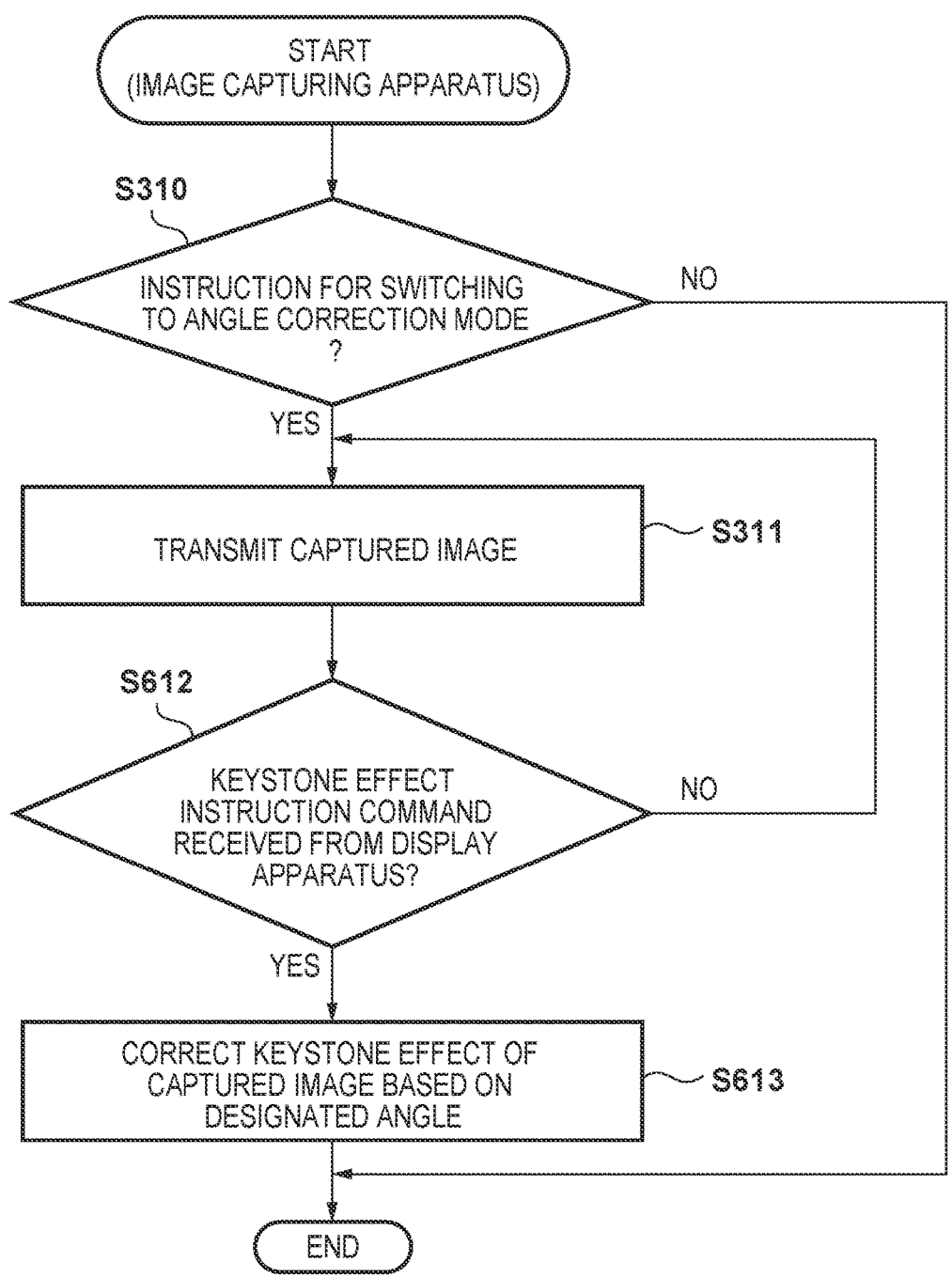

A description is now given of operations of the display apparatus 100 and the image capturing apparatus 200 according to the second embodiment with reference to FIGS. 6A and 6B. FIGS. 6A and 6B pertain to the display apparatus 100 and the image capturing apparatus 200, respectively. In FIGS. 6A and 6B, steps of performing processes that are identical or similar to processes of FIGS. 3A and 3B are given the same reference numerals thereas. Processes of steps in a flowchart of FIG. 6A are realized as a result of the control unit 5 controlling blocks of the display apparatus 100 by deploying the control program stored in the ROM to the RAM and executing the deployed control program, unless specifically stated otherwise. Similarly, processes of steps in a flowchart of FIG. 6B are realized as a result of the control unit 8 controlling blocks of the image capturing apparatus 200 by deploying the control program stored in the ROM to the RAM and executing the deployed control program, unless specifically stated otherwise.

First, the operations of the display apparatus 100 shown in FIG. 6A will be described. In step S604, the control unit 5 detects angle information output from the angle detection unit 4. This angle information indicates a forward/backward tilt angle of the display screen of the display unit 2 (see the rotation axis 902 in FIG. 9B).

In step S605, based on the angle information detected in step S604, the control unit 5 calculates auxiliary information that is used by the user as a guide for correction of the captured image. In the present embodiment, it will be assumed that the auxiliary information denotes grid-like auxiliary lines including two vertical auxiliary lines in particular. Then, the display processing unit 3 displays the auxiliary lines by superimposing the auxiliary lines over the captured image displayed on the display unit 2. As shown in FIG. 5C, tilts (angles) of the two vertical auxiliary lines change in accordance with the tilt angle of the display apparatus 100, and an interval between upper portions of the two vertical auxiliary lines differs from an interval between lower portions of the two vertical auxiliary lines. When the tilt angle of the display apparatus 100 has a reference value (e.g., an angle shown in FIG. 5B), the two vertical auxiliary lines are displayed in such a manner that they are parallel to the up-down direction of the display screen. That is to say, the displayed two vertical auxiliary lines are parallel to each other. When a top portion of the display apparatus 100 is swung backward, the interval between the upper portions of the two vertical auxiliary lines is small, whereas the interval between the lower portions of the two vertical auxiliary lines is large. When the top portion of the display apparatus 100 is swung forward, the interval between the upper portions of the two vertical auxiliary lines is large, whereas the interval between the lower portions of the two vertical auxiliary lines is small. The user tilts the display apparatus 100 forward/backward until the two vertical auxiliary lines reach an angle with which the user wants to vertically correct a subject. In examples of FIGS. 5B and 5C, the user tilts the display apparatus 100 forward/backward so that a subject's vertical line V is parallel to the vertical auxiliary lines. Note that depending on the subject types, there may be no element that is equivalent to the subject's vertical line V; in this case also, the user can correct the captured image by adjusting an angle formed by a desired portion of the subject and the vertical auxiliary lines through rotation of the display apparatus 100.

Processes of steps S608 and S609 are similar to the processes of steps S308 and S309 in FIG. 3A, except that a command is a "keystone effect instruction command". It will be assumed that angle information included in the keystone effect instruction command includes, for example, information indicating the gravitational direction detected by the angle detection unit 4, or information related to an angle (orientation) of the display surface of the display unit 2 with respect to the gravitational direction. Thereafter, the captured image that has been corrected in accordance with the keystone effect instruction command can be received from the image capturing apparatus 200 and displayed on the display unit 2. In this way, the user of the display apparatus 100 can confirm whether the keystone effect has been corrected as intended, and perform a correction operation again by switching back to the angle correction mode if necessary.

Next, the operations of the image capturing apparatus 200 shown in FIG. 6B will be described. A process of step S612 is similar to the process of step S312 in FIG. 3B, except that a command is the "keystone effect instruction command". In step S613, the image processing unit 7 corrects the keystone effect of the captured image by executing electronic image processing based on the angle information in the keystone effect instruction command. The captured image, whose keystone effect has been corrected, is transmitted to the display apparatus 100 to be reviewed on the display apparatus 100. Furthermore, information for correction, including the angle information in the keystone effect instruction command, is stored (recorded) to the ROM or the RAM in the image capturing apparatus 200, and then processing of the present flowchart is ended. Thereafter, when the image capturing apparatus 200 captures still images or moving images and records or transmits the captured images, the image processing unit 7 makes correction based on the stored information (the information for correction, including the angle information in the keystone effect instruction command). Then, the corrected captured images are recorded to the recording unit 10, or transmitted via the communication processing unit 9, as still images or moving images. That is to say, a plurality of images that are captured after receiving the keystone effect instruction command are corrected based on the stored information.

As described above, in the second embodiment, the display apparatus 100 displays a captured image received from the image capturing apparatus 200 on the display unit 2, and transmits angle information indicating a tilt angle of the display apparatus 100 (a forward/backward tilt angle of the display screen of the display unit 2) to the image capturing apparatus 200. The image capturing apparatus 200 corrects a keystone effect of the captured image in accordance with the angle information. In this way, the user can correct the keystone effect of the captured image intuitively.

Note that the first embodiment related to rotational correction for a captured image, and the second embodiment related to keystone effect correction for a captured image, can be implemented simultaneously. In this case, among auxiliary lines displayed on the display unit 2, horizontal auxiliary lines are similar to those described in the first embodiment, i.e., auxiliary lines indicating the horizontal direction detected by the display apparatus 100, whereas vertical auxiliary lines are similar to those described in the second embodiment, i.e., auxiliary lines indicating a forward/backward tilt of the display apparatus 100 (an angle of the display surface with respect to the gravitational direction). Also, angle information transmitted from the display apparatus 100 to the image capturing apparatus 200 includes information that is necessary for both rotational correction for a captured image and keystone effect correction for a captured image. Furthermore, the image capturing apparatus 200 applies both rotational correction and keystone effect correction based on angle information included in a rotation instruction command and a keystone effect instruction command received from the display apparatus 100.

Third Embodiment

The first and second embodiments have described a configuration in which a tilt or a keystone effect of an image captured by the image capturing apparatus 200 is corrected during shooting. The third embodiment describes a configuration for writing angle information to an image file, thereby enabling correction during reproduction or during image post-processing. Basic configurations of the display apparatus 100 and the image capturing apparatus 200 according to the third embodiment are similar to the configurations shown in FIG. 1 according to the first embodiment, and thus a detailed description of such configurations will be omitted. The following description focuses mainly on portions that differ from the first embodiment. Although the present invention is described in the context of correcting a tilt of a captured image, the present embodiment is also applicable similarly to the case of correcting a keystone effect of a captured image (i.e., the context of the second embodiment).

First, an overview of the third embodiment will be described with reference to FIGS. 7A and 7B. The third embodiment is similar to the first embodiment in that the display apparatus 100 transmits a rotation instruction command including angle information to the image capturing apparatus 200 (see FIG. 7A). However, as shown in FIG. 7B, the image capturing apparatus 200 writes the angle information to an image file of a captured image, instead of correcting the captured image in response to the rotation instruction command. The image capturing apparatus 200 corrects the image in accordance with the angle information during reproduction of the image file. That is to say, the image capturing apparatus 200 records the captured image in association with the angle information. Furthermore, the user can instruct the image capturing apparatus 200 whether to correct the image in accordance with the angle information via the operation unit 11.

Figure 8:
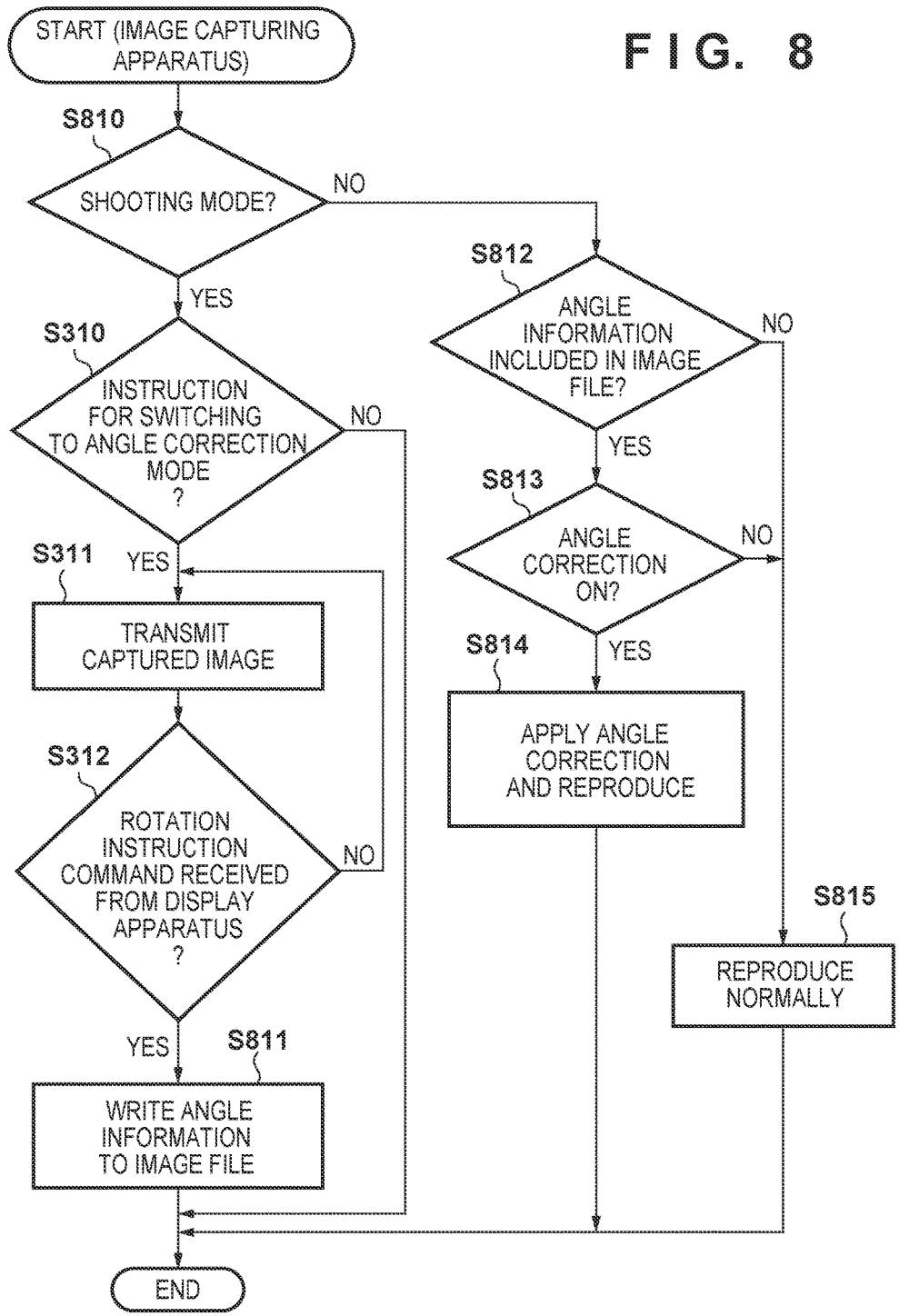
FIG. 8 is a flowchart showing operations of the image capturing apparatus 200 according to the third embodiment.

A description is now given of operations of the image capturing apparatus 200 according to the third embodiment with reference to FIG. 8. Operations of the display apparatus 100 are similar to those according to the first embodiment (see FIG. 3A). In FIG. 8, steps of performing processes that are identical or similar to processes of FIG. 3B are given the same reference numerals thereas. Processes of steps in a flowchart shown in FIG. 8 are realized as a result of the control unit 8 controlling blocks of the image capturing apparatus 200 by deploying the control program stored in the ROM to the RAM and executing the deployed control program, unless specifically stated otherwise.

In step S810, the control unit 8 of the image capturing apparatus 200 determines whether a current operation mode of the image capturing apparatus 200 is a shooting mode. If the current operation mode is the shooting mode, processing proceeds to step S310. In step S811, which follows steps S310 to S312, the control unit 8 records the captured image as an image file and writes angle information to the image file via the recording unit 10.

On the other hand, if it is determined in step S810 that the operation mode of the image capturing apparatus 200 is not the shooting mode (is a reproduction mode), the processing proceeds to step S812. In step S812, the control unit 8 determines whether an image file to be reproduced includes angle information. The processing proceeds to step S813 if the image file includes the angle information, and to step S815 if the image file does not include the angle information.

In step S813, the control unit 8 determines whether correction processing based on the angle information is in an ON state. The user can switch between ON and OFF of the correction processing via the operation unit 11. The processing proceeds to step S814 if the correction processing is in the ON state, and to step S815 if the correction processing is not in the ON state.

In step S814, the image processing unit 7 corrects an image in the image file in accordance with the angle information, and displays the corrected image on the display unit 12. The image is, for example, a moving image. On the other hand, if the image file does not include the angle information, or if the correction processing is in an OFF state, the image processing unit 7 performs normal reproduction without making correction in step S815.

Through the above processing, a tilt of an image captured by the image capturing apparatus 200 can be corrected during reproduction, instead of during shooting. By thus recording the captured image and correction information (angle information) simultaneously, the tilt can be corrected not only during reproduction, but also in post-processing with the use of an image correction tool. In this way, the user can not only determine whether to make correction after shooting, but also determine whether to make correction in consideration of tradeoff between correction and a correction-caused reduction in a cutout size within the captured image.

The above embodiments have described an example in which the display apparatus 100 transmits, to the image capturing apparatus 200, attitude information indicating a tilt of the display apparatus 100 as information used for rotation and cutout performed by the image capturing apparatus 200; however, no limitation is intended in this regard. In a case where the display apparatus 100 is configured to receive an image captured by the image capturing apparatus 200 (an image to be recorded as an image file), rotation and cutout may be performed by the display apparatus 100, instead of by the image capturing apparatus 200. That is to say, attitude information (the information described in the above embodiments—angle information, rotation instruction command) indicating a tilt of the display apparatus 100, which is generated in response to an instruction from the user, is stored to the RAM of the control unit 5 without being transmitted to the image capturing apparatus 200. After processes similar to the processes of steps S313, S613, and S811, which have been described above as processes executed by the image capturing apparatus 200, are applied to the image received from the image capturing apparatus 200 based on the information stored in the RAM, the resultant image can be recorded as the image file.

Note that the display apparatus 100 and the image capturing apparatus 200 may be controlled by a single item of hardware, or the entire apparatuses may be controlled by a plurality of items of hardware sharing processing.

Although the present invention has been elaborated based on various embodiments thereof, the present invention is not limited to these specific embodiments, and various embodiments are embraced within the present invention as long as they do not depart from the spirit of the present invention. Furthermore, the above embodiments merely represent some of embodiments of the present invention, and can also be combined as appropriate.

Although the above embodiments have described an example in which the present invention is applied to a display apparatus such as a smartphone and an image capturing apparatus such as a digital camera, the above embodiments are not limited to such an example. The present invention is applicable to any type of apparatus that receives and displays a captured image, and to any type of apparatus that captures and transmits an image. In other words, the present invention is applicable to, for example, a personal computer, a PDA, a mobile telephone terminal, a mobile image viewer, a display-equipped printer apparatus, a digital photo frame, a music player, a game console, and an electronic book reader.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-003604, filed Jan. 9, 2015, which is hereby incorporated by reference herein in its entirety.

What is claimed is:

1. A display apparatus, comprising:
at one processor or at least one circuit, which functions and operates as:
a reception unit configured to receive a captured image from an image capturing apparatus;
a display unit configured to display the captured image;
a detection unit configured to detect an attitude of the display apparatus; and
a transmission unit configured to, while the display unit is displaying the captured image, transmit attitude information to the image capturing apparatus in response to an instruction from a user, the attitude information indicating the attitude detected by the detection unit,
wherein the display unit displays, together with the captured image, auxiliary information indicating the attitude detected by the detection unit,
the auxiliary information includes two auxiliary lines that are displayed parallel to an up-down direction of the display unit when a tilt angle of the display apparatus has a reference value,
the more an upper portion of the display unit is tilted backward, the larger an interval between lower portions of the two auxiliary lines becomes compared to an interval between upper portions of the two auxiliary lines, and
the more the upper portion of the display unit is tilted forward, the smaller the interval between the lower portions of the two auxiliary lines becomes compared to the interval between the upper portions of the two auxiliary lines.

2. The display apparatus according to claim 1, wherein the auxiliary information includes a horizontal auxiliary line that represents a horizontal line perpendicular to a, gravitational direction in the display apparatus, the horizontal auxiliary line being relative to a rotation angle of the display apparatus around a rotation axis orthogonal to a display surface of the display unit.

3. The display apparatus according to claim 1, wherein the attitude information includes information indicating a gravitational direction detected by the detection unit, or information related to an angle with respect to the gravitational direction around a rotation axis orthogonal to a display surface of the display unit.

4. The display apparatus according to claim 1, wherein the attitude information includes information indicating a gravitational direction detected by the detection unit, or information related to an angle of a display surface of the display unit with respect to the gravitational direction.

5. The display apparatus according to claim 1, wherein the reception unit receives image capturing apparatus attitude information indicating an attitude of the image capturing apparatus, and
based on the image capturing apparatus attitude information, the display unit displays, together with the captured image, information indicating a horizontal direction in the image capturing apparatus.

6. The display apparatus according to claim 1, wherein the display apparatus is a mobile terminal that can be held in a hand of the user.

7. The display apparatus cording to claim 1, wherein the transmission unit transmits the attitude information as information for applying cutout and rotation processing to the captured image.

8. The display apparatus according to claim 1, wherein
after the attitude information has been transmitted to the image capturing apparatus, the reception unit receives the captured image that has been corrected based on the attitude information, and
the display unit displays the corrected captured image.

9. An image capturing system including a display apparatus and an image capturing apparatus, the display apparatus comprising:
at least one processor or at least one circuit, which functions and operates as:
a first reception unit configured to receive a captured image from the image capturing apparatus;
a display unit configured to display the captured image;
a detection unit configured to detect an attitude of the display apparatus; and
a first transmission unit configured to, while the display unit is displaying the captured image, transmit attitude information to the image capturing apparatus in response to an instruction from a user, the attitude information indicating the attitude detected by the detection unit,
wherein the display unit displays, together with the captured image, auxiliary information indicating the attitude detected by the detection unit,
the auxiliary information includes two auxiliary lines that are displayed parallel to an up-down direction of the display unit when a tilt angle of the display apparatus has a reference value,
the more an upper portion of the display unit is tilted backward, the larger an interval between lower portions of the two auxiliary lines becomes compared to an interval between upper portions of the two auxiliary lines, and
the more the upper portion of the display unit is tilted forward, the smaller the interval between the lower portions of the two auxiliary lines becomes compared to the interval between the upper portions of the two auxiliary lines, the image capturing apparatus comprising:
at least one processor or at least one circuit, which functions and operates as:
an image capturing unit configured to generate the captured image;
a second transmission unit configured to transmit the captured image to the display apparatus;
a second reception unit configured to receive the attitude information indicating the attitude of the display apparatus from the display apparatus; and
a processing unit configured to apply specific processing to the captured image based on the attitude information received by the second reception of the image capturing apparatus, and record the captured image.

10. A control method for a display apparatus including a display unit and an attitude detection unit the control method comprising:
receiving a captured image from an image capturing apparatus;
displaying the captured image on the display unit;
detecting an attitude of the display apparatus with the attitude detection unit; and
while displaying the captured image on the display unit, transmitting attitude information to the image capturing apparatus in response to an instruction from a user, the attitude information indicating the attitude detected by the detecting,
wherein the displaying displays, together with the captured image, auxiliary information indicating the attitude detected by the attitude detection unit,
the auxiliary information includes two auxiliary lines that are displayed parallel to an up-down direction of the display unit when a tilt angle of the display apparatus has a reference value,
the more an upper portion of the display unit is tilted backward, the larger an interval between lower portions of the two auxiliary lines becomes compared to an interval between upper portions of the two auxiliary lines, and
the more the upper portion of the display unit is tilted forward, the smaller the interval between the lower portions of the two auxiliary lines becomes compared to the interval between the upper portions of the two auxiliary lines.

11. A non-transitory computer-readable storage medium which stores a program for causing at least one processor or at least one circuit in a computer to function and operate as a display apparatus comprising:
a reception unit configured to receive a captured image from an image capturing, apparatus;
a display unit configured to display the captured image;
a detection unit configured to detect an attitude of the display apparatus; and
a transmission unit configured to, while the display unit is displaying the captured image, transmit attitude information to the image capturing apparatus in response to an instruction from a user, the attitude information indicating the attitude detected by the detection unit,
wherein the display unit displays, together with the captured image, auxiliary information indicating the attitude detected by the detection unit,
the auxiliary information includes two auxiliary lines that are displayed parallel to an up-down direction of the display unit when a tilt angle of the display apparatus has a reference value,
the more an upper portion of the display unit is tilted backward, the larger an interval between lower portions of the two auxiliary lines becomes compared to an interval between upper portions of the two auxiliary lines, and
the more the upper portion of the display unit is tilted forward, the smaller the interval between the lower portions of the two auxiliary lines becomes compared to the interval between the upper portions of the two auxiliary lines.

* * * * *